US009944266B2

(12) United States Patent
Leinung et al.

(10) Patent No.: US 9,944,266 B2
(45) Date of Patent: Apr. 17, 2018

(54) ELECTROPNEUMATIC BRAKE CONTROL DEVICE WITH AUTOMATIC VENTILATION OF THE SPRING APPLIED BRAKE IN THE EVENT OF A POWER LOSS

(71) Applicant: KNORR-BREMSE Systeme fuer Nutzfahrzeuge GmbH, Munich (DE)

(72) Inventors: Andreas Leinung, Munich (DE); Max Michalski, Neubiberg (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 15/358,272

(22) Filed: Nov. 22, 2016

(65) Prior Publication Data

US 2017/0072930 A1    Mar. 16, 2017

Related U.S. Application Data

(63) Continuation of application No. PCT/EP2015/059023, filed on Apr. 27, 2015.

(30) Foreign Application Priority Data

May 23, 2014    (DE) .................. 10 2014 107 278

(51) Int. Cl.
*B60T 13/68* (2006.01)
*B60T 17/08* (2006.01)
*B60T 8/17* (2006.01)

(52) U.S. Cl.
CPC .......... *B60T 13/683* (2013.01); *B60T 8/1708* (2013.01); *B60T 17/083* (2013.01)

(58) Field of Classification Search
CPC ...... B60T 8/1708; B60T 8/3675; B60T 13/68; B60T 13/268; B60T 13/327; B60T 13/683

(Continued)

(56) References Cited

U.S. PATENT DOCUMENTS 8,297,714 B2*  10/2012  Bensch .................. B60T 8/362
                                                    303/34
2005/0029859 A1*  2/2005  Bensch .................. B60T 7/10
                                                    303/89

(Continued)

FOREIGN PATENT DOCUMENTS

DE    10 2006 041 008 A1    3/2008
EP         1 968 830 B1    3/2010
WO    WO 2007/065498 A1    6/2007

OTHER PUBLICATIONS

International Preliminary Report on Patentability (PCT/IB/326 & PCT/IB/338 & PCT/IB/373) issued in PCT Application No. PCT/EP2015/059023 dated Dec. 8, 2016, including English translation of document C2 (German-language Written Opinion (PCT/ISA/237)) previously filed on Nov. 22, 2016 (nine (9) pages).

(Continued)

*Primary Examiner* — Christopher P Schwartz
(74) *Attorney, Agent, or Firm* — Crowell & Moring LLP

(57) ABSTRACT

An electropneumatic brake control device controls a parking brake of a vehicle with a service brake and the parking brake. It includes an electromagnetic valve device which can be supplied with compressed air from a compressed air storage via a storage connection; a parking brake signal connection for inputting parking brake signals output by an electric parking brake signaling device; and an air quantity-boosting valve device which is pneumatically controlled by the electromagnetic valve device and which has a working outlet that can be connected to a first outlet connection for at least one spring applied brake cylinder. A control air line is provided between an outlet of the electromagnetic valve device and a pneumatic control inlet of the air quantity-boosting valve device. A pneumatically controlled 2/2-way valve has an inlet which can be connected to the control air line or the working outlet of the air quantity-boosting valve (Continued)

device, an outlet which is connected to a pressure sink, and a pneumatic control connection for a stored pressure of the service brake. The pneumatically controlled 2/2-way valve has two positions: a conducting position, which is smaller than a specified threshold value in the event of a stored pressure of the service brake and in which the inlet is connected to the outlet, and a blocking position, which is larger than a specified pressure threshold in the event of a stored pressure of the service brake and in which the inlet is blocked from the outlet.

12 Claims, 2 Drawing Sheets

(58) Field of Classification Search
USPC .............. 303/3, 7, 15, 17, 20, 122.15, 128
See application file for complete search history.

(56) References Cited

U.S. PATENT DOCUMENTS

| | | | | |
|---|---|---|---|---|
| 2009/0280959 A1* | 11/2009 | Bensch | ............ | B60T 8/1708 477/198 |
| 2010/0025141 A1* | 2/2010 | Bensch | ............ | B60T 8/327 180/271 |
| 2010/0072810 A1* | 3/2010 | Bensch | ............ | B60T 8/362 303/17 |
| 2010/0237690 A1* | 9/2010 | Forster | ............ | B60T 7/20 303/13 |
| 2011/0012421 A1* | 1/2011 | Bensch | ............ | B60T 8/1708 303/115.2 |
| 2011/0062774 A1* | 3/2011 | Bensch | ............ | B60T 13/385 303/9.61 |

OTHER PUBLICATIONS

International Search Report (PCT/ISA/210) issued in PCT Application No. PCT/EP2015/059023 dated Jul. 20, 2015 with English translation (five pages).

German-language Written Opinion (PCT/ISA/237) issued in PCT Application No. PCT/EP2015/059023 dated Jul. 20, 2015 (five pages).

German Search Report issued in counterpart German Application No. 10 2014 107 278.2 dated Jan. 13, 2015 (six pages).

\* cited by examiner

ELECTROPNEUMATIC BRAKE CONTROL DEVICE WITH AUTOMATIC VENTILATION OF THE SPRING APPLIED BRAKE IN THE EVENT OF A POWER LOSS

CROSS REFERENCE TO RELATED APPLICATIONS

This application is a continuation of PCT International Application No. PCT/EP2015/059023, filed Apr. 27, 2015, which claims priority under 35 U.S.C. § 119 from German Patent Application No. 10 2014 107 278.2, filed May 23, 2014, the entire disclosures of which are herein expressly incorporated by reference.

BACKGROUND AND SUMMARY OF THE INVENTION

The invention relates to an electropneumatic brake control device for controlling a parking brake of a vehicle having a service brake and a parking brake. It includes an electromagnetic valve device which is controlled by an electronic control device and can be supplied with compressed air from a compressed air store via a store connector, a parking brake signal terminal for inputting parking brake signals which are output by way of an electric parking brake signal transmitter, a valve device which is controlled pneumatically by the electromagnetic valve device and boosts the air quantity, with an operating output which can be connected to a first output connector for at least one spring brake cylinder. The operating output is ventilated in order to apply the at least one spring brake cylinder and is aerated in order to release it. A control air line is provided between an outlet of the electromagnetic valve device and a pneumatic control connector of the valve device which boosts the air quantity.

In electropneumatic brake control devices of this type, a failure of the electric power supply represents a problem because the electromagnetic valve device can then no longer be actuated. In addition, the electric parking brake signal transmitter also fails. It has therefore already been proposed to automatically ventilate the spring brake cylinders of the spring-loaded brake if the electric power supply fails. However, an emergency braking operation of this type is problematic during current driving because the vehicle can then come to a standstill at an unsuitable location and also because an emergency braking operation of this type takes place with rapid ventilation of the spring-loaded brake with a high braking force, there being the risk of a collision by following vehicles.

In order to solve this problem, EP 1 968 830 B1 proposes arranging a 3/2-way valve in the control line of the valve device (relay valve) which boosts the air quantity between the store connector and an electric bistable valve in the case of an electropneumatic brake control device of the generic type. It is possible for the bistable valve to be connected to the pneumatic control connector of the relay valve. In a passage position of the 3/2-way valve, the latter connects the store connector to the bistable valve and therefore to the control connector of the relay valve, in order to keep the spring-loaded brake released (driving position). In a ventilation position, the 3/2-way valve connects the bistable valve to a pressure sink (parked position), however, with the result that the pneumatic control connector of the relay valve is ventilated and, as a result, the spring-loaded brake is applied. The 3/2-way valve is controlled pneumatically by the supply pressure of the service brake in such a way that the passage or driving position is assumed if the supply pressure of the service brake exceeds a pressure threshold, but the ventilation or parked position is assumed if the supply pressure of the service brake undershoots the pressure threshold. In the case of an intact electric power supply, if the supply pressure in the compressed air stores drops owing to actuation of the service brake, the compressor counteracts this by way of additional delivery, with the result that the threshold value is not undershot in said circumstances. In the case of a failure of the electric power supply, however, the drive machine of the vehicle and therefore an additional delivery by way of the compressor fail as a rule, with the result that, if the service brake is actuated again, the compressed air stores of the service brake are emptied and, as a result, the supply pressure which acts as a control pressure for the 3/2-way valve falls below the threshold value. The 3/2-way valve then automatically switches into its ventilation or parked position, in which the spring-loaded brake is applied. Since the service brake has previously been actuated repeatedly, it is assumed that the vehicle is then already in a braked state or at a standstill, with the result that the abovementioned disadvantages might be avoided.

The invention is based on the object of developing an above-described electropneumatic brake control device in such a way that it has higher reliability with a simpler construction.

According to the invention, this and other objects are achieved by an electropneumatic brake control device for controlling a parking brake of a vehicle having a service brake and a parking brake, comprising:

a) an electromagnetic valve device which is controlled by an electronic control device and is supplied with compressed air from a compressed air store via a store connector;

b) a parking brake signal terminal for inputting parking brake signals which are output by way of an electric parking brake signal transmitter;

c) a valve device which is controlled pneumatically by the electromagnetic valve device and boosts the air quantity, with an operating output which can be connected to a first output connector for at least one spring brake cylinder, which operating output is ventilated in order to apply the at least one spring brake cylinder and is aerated in order to release it;

d) a control air line between an outlet of the electromagnetic valve device and a pneumatic control input of the valve device which boosts the air quantity;

e) a pneumatically controlled 2/2-way valve, with an inlet which is connectable or is connected to the control air line or to the operating output of the valve device which boosts the air quantity, an outlet which is connected to a pressure sink, and with a pneumatic control connector for a supply pressure of the service brake, wherein f) the pneumatically controlled 2/2-way valve has two positions, a passage position which is set at a supply pressure of the service brake which is lower than a predefined pressure limit value and in which the inlet is connected to the outlet, and a shut-off position which is set at a supply pressure of the service brake which is greater than a predefined pressure limit value and in which the inlet is shut off with respect to the outlet.

The invention is distinguished by the pneumatically controlled 2/2-way valve, with an inlet which can be connected or is connected to the control air line or to the operating output of the valve device which boosts the air quantity, an outlet which is connected to a pressure sink, and with a pneumatic control connector for a supply pressure of the service brake, the pneumatically controlled 2/2-way valve having two positions, a passage position which is set at a supply pressure of the service brake which is lower than a predefined pressure limit value and in which the inlet is connected to the outlet, and a shut-off position which is set at a supply pressure of the service brake which is greater than a predefined pressure limit value and in which the inlet is shut off with respect to the outlet.

Here, the inlet of the pneumatically controlled 2/2-way valve can be connected or is connected, for example, directly or indirectly, for example via a further valve device, to the control air line or to the operating output of the valve device which boosts the air quantity.

Since all the solenoid valves of the electropneumatic brake control device are combined or arranged in the electromagnetic valve device, no solenoid valve is arranged in the control air line between the outlet of the electromagnetic valve device and the pneumatic control connector of the valve device which boosts the air quantity, the switching positions of which solenoid valve, which are dependent on energization or non-energization, might impede or prevent a flow connection between the outlet of the electromagnetic valve device and the pneumatic control connector of the valve device which boosts the air quantity by way of the control air line.

Firstly, a 2/2-way valve is therefore used instead of a 3/2-way valve for ventilation in the case of a failure of the electric power supply, which 2/2-way valve can be manufactured and assembled more simply.

Secondly, the 2/2-way valve is not arranged upstream of the solenoid valves of the electromagnetic valve device as in the prior art, as viewed from the supply air connector, but rather is arranged downstream thereof. Furthermore, the 2/2-way valve is then not connected in the control air line for the valve device which boosts the air quantity and is not connected in series in relation to the solenoid valves there, but rather is connected in a branch line which branches off from the control air line. This affords the further advantage that there are no longer any solenoid valves which are arranged downstream of the 2/2-way valve, the switching position of which might impede or prevent a ventilation of the pneumatic control connector of the valve device which boosts the air quantity. As a result, the functional security and reliability of the brake control device are increased.

With regard to the functionality of the electropneumatic brake control device, in the case of an intact electric power supply, if the supply pressure in the compressed air stores of the service brake circuit drops owing to actuation of the service brake, the compressor counteracts this by way of additional delivery, with the result that the pressure limit value is not undershot in said circumstances. As a result, the 2/2-way valve remains in or switches into the shut-off or driving position, in which the control air line of the valve device which boosts the air quantity is shut off with respect to the pressure sink.

In the case of a failure of the electric power supply, however, the additional delivery by way of the compressor fails, with the result that, in the case of a repeated actuation of the service brake, the compressed air stores of the service brake are emptied and, as a result, the supply pressure which acts as a control pressure for the 2/2-way valve falls below the pressure limit value. The 2/2-way valve then switches automatically, for example by way of spring loading, into its ventilation or parked position, in which the control air line is ventilated and the spring-loaded brake or the spring brake cylinders which are connected to the operating connector of the valve device which boosts the air quantity are applied, in order to apply the parking brake. Since the service brake has previously been actuated repeatedly, it is assumed that the vehicle is already in a braked state or at a standstill. As a result, it is ensured with high probability that, in the case of a failure of the electric power supply, the parking brake is engaged automatically only at a standstill of the vehicle.

The 2/2-way valve is preferably formed by way of a diaphragm valve, the opening pressure of which can be set in a simple way, for example by way of a spring, the prestress of which can be set.

According to one development, the electropneumatic brake control device represents one structural unit, it being possible for the 2/2-way valve to be integrated into the structural unit or not.

The 2/2-way valve is particularly preferably spring-loaded into the passage position counter to the action of a supply pressure of the service brake which prevails at the pneumatic control connector. If the supply pressure of the service brake then falls below the pressure limit value, the spring loading of the valve member ensures an automatic switchover of the 2/2-way valve into the passage or ventilation position.

The electropneumatic brake control device particularly preferably has at least one second output connector for a trailer control valve, the valve device being connected to the control air line and being configured such that it outputs a pressure signal which represents the parked state to the second output connector in the case of a pressure drop in the control air line which is brought about by way of the passage position of the pneumatically controlled 2/2-way valve. Said pressure signal can consist of an aeration or ventilation signal. Since trailer control valves act in an inverting manner in relation to the input pressure, in the case of switching of the 2/2-way valve, brought about by way of the failure of the electric power supply, into the passage or parked position by way of the electromagnetic valve device, into which the pressure drop in the control air line which is brought about as a result is fed back, the control pressure at the second output connector for the trailer control valve is reduced, for example, and the brake pressure for the service brakes in the trailer is increased to application pressure as a result. As a result, in the case of a failure of the electric power supply, not only are the spring brake cylinders of the tractor vehicle applied, but rather the service brakes of the trailer are also applied automatically.

The pressure sink can be formed, for example, by way of a ventilating connector which opens to atmosphere or by way of at least one compressed air store, in particular by way of a compressed air store of a service brake circuit which is then ventilated or has already been ventilated on account of the failure of the power supply, with the result that there is the necessary pressure gradient between the control air line and the compressed air store.

When, in particular, the pressure sink is formed by way of at least one compressed air store, a check valve is arranged in a compressed air connection between the inlet of the 2/2-way valve and the control air line according to one development, by way of which check valve a desired compressed air flow from the control air line to the inlet of the 2/2-way valve or to the pressure sink is made possible in the passage position, but an undesired compressed air flow from the inlet or the pressure sink into the control air line is suppressed.

The invention also relates to an electropneumatic brake system of a vehicle having a service brake and a parking brake, in particular of a heavy commercial vehicle with trailer operation, the service brake having a brake pedal and at least one compressed air store which is supplied with compressed air by a compressor and from which compressed air can be input in a manner which is dependent on an actuation of the brake pedal into service brake cylinders which can be actuated by compressed air. The parking brake has an electric parking brake signal transmitter which inputs parking brake signals into the signal terminal of an above-described electropneumatic brake control device, the first output connector of which is connected to at least one spring brake cylinder, the pneumatic control connector of the 2/2-way valve being connected indirectly or directly to the at least one compressed air store of the service brake. In this context, an indirect connection means that elements such as pressure limiting valves, overflow valves, shuttle valves or the like can be connected between the pneumatic control connector of the 2/2-way valve and the at least one compressed air store, which elements ensure that the supply pressure which prevails at the pneumatic control connector is influenced or changed. In the case of a direct connection, in contrast, the supply pressure of the at least one compressed air store prevails at the pneumatic control connector of the 2/2-way valve in an unchanged manner.

In customary electropneumatic brake systems such as EBS systems (electronic braking system), there are usually at least two service brake circuits with in each case one dedicated compressed air store, namely a first service brake circuit with a first compressed air store and a second service brake circuit with a second compressed air store. In an electropneumatic brake system of this type, a selection device is then preferably provided for forwarding the higher supply pressure of the supply pressures of the compressed air stores (first compressed air store, second compressed air store) to the pneumatic control connector of the 2/2-way valve, with a first inlet which is connected to the first compressed air store of the first service brake circuit, a second inlet which is connected to the second compressed air store of the second service brake circuit, and an outlet which is connected to the pneumatic control connector of the 2/2-way valve. Said selection device is formed, for example, by way of a shuttle valve which then forms a logical OR gate.

As a result of the measures, the control pressure for the 2/2-way valve is formed by way of the respectively higher supply pressure of the service brake circuits, with the result that a failure of a single service brake circuit, for example on account of a leak, does not already lead to a supply pressure in said service brake circuit which lies below the pressure limit value and then leads to an unnecessary switchover of the 2/2-way valve into the passage or parked position, since there does not necessarily also have to be a failure of the electric power supply in a leakage case of this type. Said measures therefore improve the functional reliability of the electropneumatic brake system.

According to one development, in each case one throttle device is provided between the first compressed air store and the first inlet of the selection device and between the second compressed air store and the second inlet of the selection device, the throttle cross section of which throttle device is at least so small that a volumetric flow which has occurred unintentionally between the first inlet and the second inlet of the selection device is smaller than a minimum delivery volumetric flow which the compressor is capable of additionally delivering into the compressed air stores at a minimum delivery output. An undesired volumetric flow of this type between the first inlet and the second inlet of the selection device can be produced, for example, by way of an intermediate position of the selection device or the shuttle valve. Said measures therefore improve the functional reliability of the electropneumatic brake system.

The invention also relates to a vehicle, comprising an above-described electropneumatic brake system, in particular to a tractor vehicle which is equipped for trailer operation having a trailer control valve.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
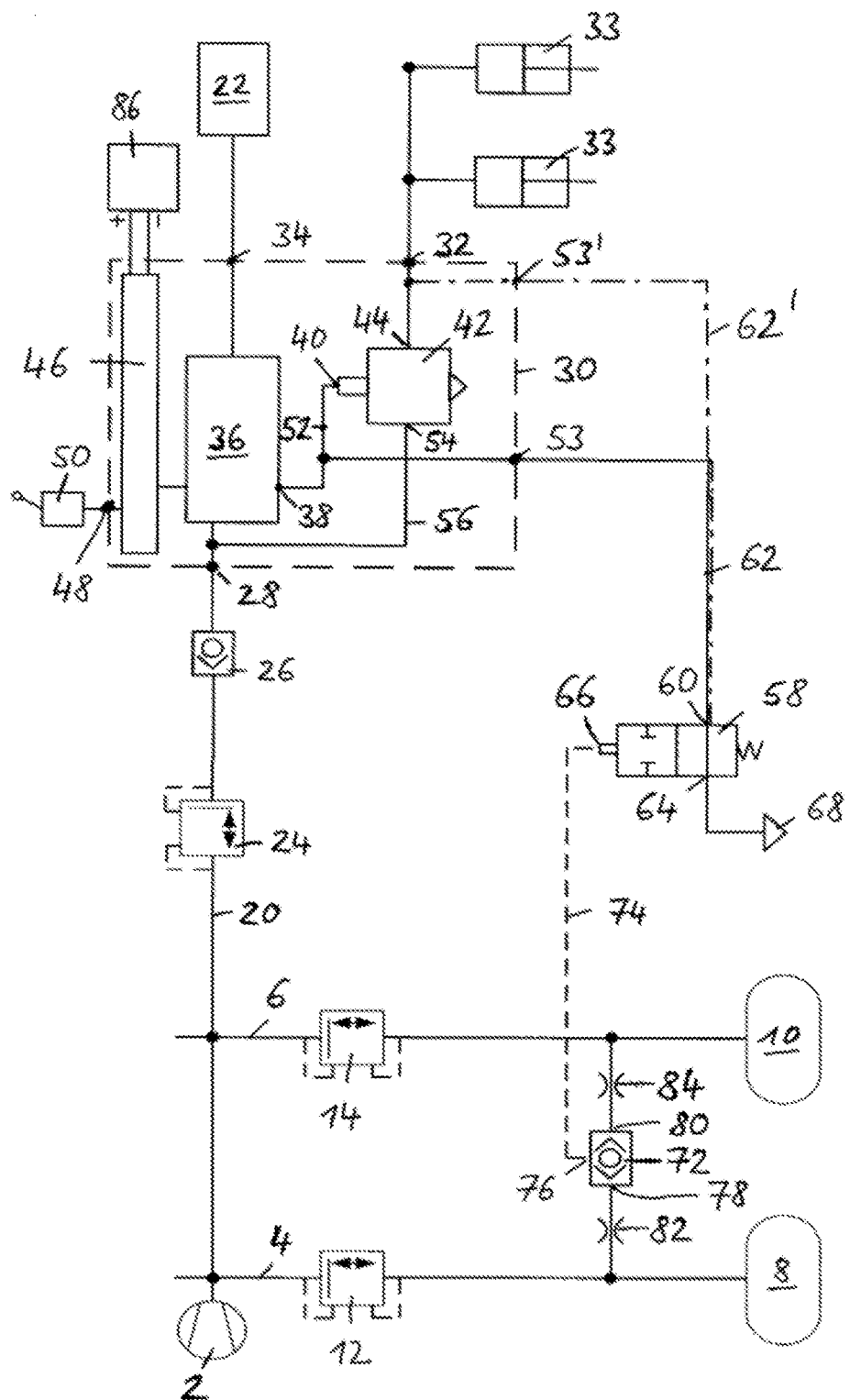
FIG. 1 is a schematic circuit diagram of a detail of an electropneumatic brake system of a tractor vehicle of a tractor vehicle/trailer combination having an electropneumatic brake control device in accordance with one preferred embodiment of the invention.

FIG. 1 shows a detail of an electropneumatic brake system 1 of a tractor vehicle/trailer combination having a service brake and a parking brake. The electropneumatic brake system 1 is preferably a brake system which is regulated electronically with regard to the brake pressure (EBS).

The brake system 1 is supplied with compressed air in a known manner by a compressor 2 which is driven by a drive machine, in particular a compression ignition internal combustion engine. To this end, the compressor 2 is connected via two compressed air supply lines 4, 6 to two compressed air stores 8, 10, each of the compressed air stores 8, 10 being assigned to a service brake circuit of the service brake. In each case one overflow valve 12, 14, with a known purpose and/or function, is arranged in the compressed air supply lines 4, 6 between the compressor 2 and the compressed air stores 8, 10. To this extent, the circuits are separated.

The further elements of the service brake, such as electric brake pedal module, brake control unit, pressure control modules, ABS pressure control valves, service brake cylinders, are not shown here since it is not necessary for an understanding of the invention.

A compressed air supply line 20 for a parking brake circuit branches off from the two compressed air supply lines 4, 6 of the two service brake circuits. Here, the parking brake is therefore supplied with compressed air by the compressed air stores 8, 10 of the service brake circuits. As an alternative, there might also be a dedicated compressed air store for the parking brake circuit.

An overflow valve 24 and a check valve 26 are arranged in the compressed air supply line 20 of the parking brake circuit in order to secure the circuit. Furthermore, the compressed air supply line 20 of the parking brake circuit is connected to a store connector 28 of an electropneumatic brake control device 30, by way of which various functions in conjunction with the parking brake can be controlled, in particular known functions such as the driving function, parking function, test function, anti jackknifing brake function and auxiliary brake function.

Since the electropneumatic brake control device 30 can be configured as a structural unit and, as such, can be connected to an existing brake system, it can also be called a parking brake module (Electronic Parking Brake Module, EPBM).

For example, two spring brake cylinders 33 on the rear axle of the tractor vehicle are connected to a first output connector 32 of the electropneumatic brake control device 30. A second output connector 34 is connected to an electropneumatic trailer control valve or module 22 which controls the trailer brakes.

The electropneumatic brake control device 30 comprises an electromagnetic valve device 36 (shown here merely in simplified form as a small box) with solenoid valves such as an inlet valve, outlet valve, bistable valve, etc., by way of which valve device 36 a pneumatic control pressure is generated, inter alia at a connector 38, for a pneumatic control input 40 of a relay valve 42, the operating output 44 of which is connected to the first output connector 32. Furthermore, the second output connector 34 for the trailer control module 22 is connected to the valve device 36 in a controllable manner.

The electropneumatic brake control device 30 comprises an electronic control device 46 for controlling the solenoid valves of the electropneumatic valve device 36, inter alia in a manner which is dependent on parking brake signals which are input via a parking brake signal terminal 48 and are generated by a parking brake signal transmitter 50 which can be actuated by the driver, such as a rocker switch or an operating lever. Furthermore, signals from integrated sensor devices, such as pressure sensors for example, are input into the electronic control device 46, which sensor devices measure the actual pressures at the output connectors 32, 34, in order to realize a brake pressure control operation, as is advantageous, for example, within the context of an auxiliary braking operation, by way of a setpoint/actual value comparison in the control device 46. The pneumatic part of the electropneumatic valve device 36 is supplied with the compressed air of the parking brake circuit by way of the store connector 28.

The control input 40 of the relay valve 42 is connected to the outlet 38 of the electropneumatic valve device 36, and a store input 54 is connected via a compressed air connection 56 to the store connector 28. It modulates an operating pressure at its operating output 44 on the basis of the supply pressure in a manner which is dependent on the control pressure which prevails in the control air line 52 and is output by the electropneumatic valve device 36, which operating pressure are then input into the spring brake cylinders 33 via the first output connector 32. In order to apply the spring brake cylinders 33, the first output connector 32 is ventilated and aerated for release purposes.

Since all the solenoid valves and/or electrically actuated components are preferably combined in the electromagnetic valve device 36, there are also preferably no solenoid valves in the control air line 52. However, a shuttle valve is conceivable in the control air line, which shuttle valve controls the greater pressure of the control pressure which is output by the valve device 36 and a service brake pressure which is input via a service brake pressure connector (not shown here) to the control input 40 of the relay valve 42, for anti-compound reasons. For the connection of the first pressure connection 62 to the brake control device 30, a corresponding third output connector 53 is provided on the latter.

Furthermore, the brake system comprises a pneumatically controlled 2/2-way valve 58, having an inlet 60 which is preferably connected directly via a first pressure connection 62 to the control air line 52 here, an outlet 64 which is connected to a pressure sink 68, and having a pneumatic control connector 66 for a supply pressure of the service brake. In the exemplary embodiment of FIG. 1, the pressure sink is formed, for example, by way of a ventilation means 68 of the 2/2-way valve 58.

As shown in FIG. 1 by way of the first pressure connection 62' which is shown as a dash-dotted line, the inlet 60 of the pneumatically controlled 2/2-way valve 58 can, as an alternative, be connected or be capable of being connected to the operating output 44 of the relay valve 42 or to the first output connector 32, optionally also by means of a further valve device. A corresponding connector 53' is then provided. As an alternative, the first pressure connection 62' might also be connected to the first output connector 32.

The pneumatically controlled 2/2-way valve 58 has two positions, a passage or parked position which is set at a supply pressure of the service brake at the control connector 66 which is lower than a predefined pressure limit value and in which the inlet 60 is connected to the outlet 64, and a shut-off or driving position which is set at a supply pressure of the service brake which is greater than a predefined pressure limit value and in which the inlet 60 is shut off with respect to the outlet 64. The 2/2-way valve 58 is preferably a diaphragm valve which is controlled by the control pressure at its pneumatic control connector 66 and is, for example, spring-loaded into its passage position. If the supply pressure of the service brake then falls below the pressure limit value, the spring loading of the valve member which is connected to the diaphragm ensures an automatic switchover of the 2/2-way valve 58 into the passage or ventilation position.

The 2/2-way valve 58 can be integrated into the electropneumatic brake control device 30, but is preferably a separate structural unit here.

The first pressure connection 62 branches off from the control air line 52 at a point between the outlet 38 of the valve device 36 and the control input 40 of the relay valve 42, with the result that, for example, the control input 40 of the relay valve 42 is connected directly to the inlet 60 of the 2/2-way valve 58 here without further solenoid valves being connected in between. To this extent, the connection of the inlet 60 of the 2/2-way valve 58 to the control input 40 of the relay valve 42 can certainly be called direct.

A selection device is preferably provided here in the form of a shuttle valve 72 (Select High) for forwarding the higher supply pressure of the supply pressures of the compressed air stores 8, 10 to the pneumatic control connector 66 of the 2/2-way valve 58. To this end, the pneumatic control connector 66 is connected via a second pressure connection 74 to an outlet 76 of the shuttle valve 72, the first inlet 78 of which is connected to the first compressed air store 8 of the first service brake circuit and the second inlet 80 of which is connected to the second compressed air store 10 of the second service brake circuit.

The shuttle valve 72 then forms a logical "OR" gate in relation to the supply pressures in the compressed air stores 8, 10. By way of said measures, the control pressure for the 2/2-way valve 58 is formed by way of the respectively higher supply pressure of the service brake circuits.

In each case one throttle device 82, 84 is particularly preferably provided between the first compressed air store 8 and the first inlet 78 of the shuttle valve and between the second compressed air store 10 and the second inlet 80 of the shuttle valve. In the two throttle devices 82, 84, the throttle cross section is at least so small that a volumetric flow which is produced unintentionally between the first inlet 78 and the second inlet 80 of the shuttle valve 72, for example as a result of an undefined intermediate position of the valve member of the shuttle valve 72, is smaller than a minimum delivery volumetric flow which the compressor 2 is capable of additionally delivering into the compressed air stores 8, 10 at a minimum delivery output.

The electric components of the brake system 1, such as coils of the solenoid valves, sensor devices, control device, etc., are supplied with current by an electric energy source such as a battery 86.

Against this background, the method of operation of the brake system 1 with regard to the functional capability of the electric energy supply 86 is as follows:

In the case of an intact electric power supply, if the supply pressure in the compressed air stores 8, 10 of the two service brake circuits drops owing to actuation of the brake pedal of the service brake, the compressor 2 counteracts this by way of additional delivery, with the result that the pressure limit value is not undershot in said circumstances. As a result, the 2/2-way valve 58 remains in or switches into the shut-off or driving position, in which the control air line 52 of the relay valve 42 is shut off with respect to the pressure sink 68.

In the case of a failure of the electric power supply 86, however, the drive machine and, as a result, also the additional delivery by way of the compressor 2 fail as a rule, with the result that, if the service brake is actuated again, the compressed air stores 8, 10 of the service brake circuits are emptied and, as a result, the supply pressure which acts as a control pressure for the 2/2-way valve 58 falls below the pressure limit value. The 2/2-way valve 58 then automatically switches, for example by way of spring loading, into its ventilation or parked position, in which the control air line 52 is ventilated and the spring-loaded brake or the spring brake cylinders which are connected to the operating connector 44 of the relay valve 42 are applied, in order to apply the parking brake.

The pressure drop in the control air line 52 is also input via the connector 38 into the valve device 36 which is configured such that, in the case of a pressure drop of this type at its connector 38, it inputs a pressure signal which represents a parked position to the second output connector 34 for the trailer control valve 22. Said pressure signal can consist of an aeration or ventilation of the second connector 34, depending on whether the brakes of the trailer are to be applied or released during parking. The pressure drop in the control air line 52 or at the connector 38 ensures, for example at a pneumatic control input of a (likewise) pneumatically controlled bi stable valve within the valve device 36, that the bistable valve outputs the pressure signal which represents the parked position to the second output connector 34 for the trailer control valve 22.

Here too, the trailer brakes are preferably also to be applied during parking. Since trailer control valves 22 act in an inverting manner in relation to the input pressure, in the case of the switching, brought about by way of the failure of the electric power supply 86, of the 2/2-way valve 58 into the passage or parked position and the pressure drop caused as a result in the control air line and therefore at the connector 38, the valve device 36 is controlled in such a way that the control pressure at the second output connector 34 and also at the trailer control valve 22 is reduced and, as a result, the brake pressure for the brakes in the trailer is increased to application pressure. As a result, in the case of a failure of the electric power supply 86, preferably not only the spring brake cylinders of the tractor vehicle are automatically applied, but rather also the service brakes of the trailer.

As a result of the shuttle valve 72, the control pressure for the 2/2-way valve 58 is formed by way of the respectively higher supply pressure of the service brake circuits, with the result that a failure of a single service brake circuit, for example on account of a leak, does not already lead to a supply pressure in said service brake circuit, which supply pressure lies below the pressure limit value and then leads to an unnecessary switchover of the 2/2-way valve 58 into the passage or parked position, since, in the case of a leak of this type, a failure of the electric power supply 86 does not also necessarily have to be present.

Figure 2:
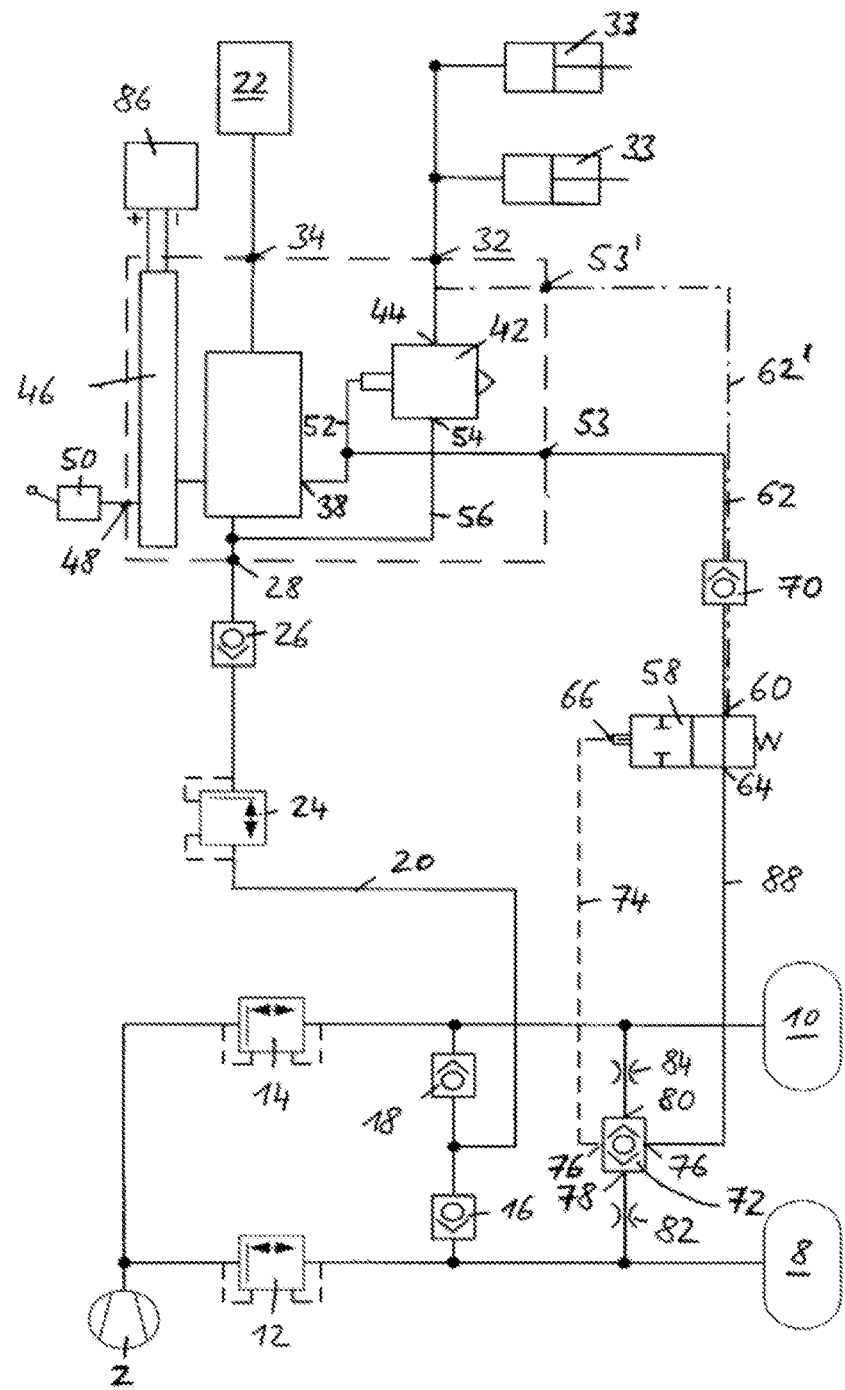
FIG. 2 is a schematic circuit diagram of a detail of an electropneumatic brake system of a tractor vehicle of a tractor vehicle/trailer combination having an electropneumatic brake control device in accordance with a further embodiment of the invention.

In the further exemplary embodiment which is shown in FIG. 2, identical or identically acting components are labelled by the same designations. In contrast to FIG. 1, the compressed air supply line 20 for the parking brake circuit is secured, for example, via two check valves 16, 18 which are connected to the compressed air supply lines 4, 6 of the two service brake circuits.

Moreover, the ventilation of the control air line 52 by way of the 2/2-way valve 58 does not take place via a ventilation means 68 to atmosphere, but rather by way of ventilation via a pressure line 88 which is connected to the outlet 64 to the outlet 76 of the shuttle valve 72 and, from there, either into the first compressed air store 8 or into the second compressed air store 10, depending on which compressed air store 8 or 10 has the higher supply pressure. Since the compressed air stores 8, 10 of the service brake circuits are ventilated or have already been ventilated on account of the failure of the power supply, there is the necessary pressure gradient between the control air line 52 and the respective compressed air store 8, 10.

Furthermore, in the embodiment of FIG. 2, a check valve 70 is arranged in the first pressure connection 62 between the inlet 60 of the 2/2-way valve 58 and the control air line 52, by way of which check valve 70 a compressed air flow from the control air line 52 to the inlet 60 of the 2/2-way valve 58 or to the pressure sink 58 in the passage position is made possible, but a compressed air flow from the inlet 60 or the pressure sink 58 into the control air line 52 is suppressed. Therefore, the check valve 70 prevents pressure loading of the control air line 52 and therefore a release of the spring-loaded brake of the tractor vehicle and/or the trailer brakes via the 2/2-way valve 58 which is switched into the passage position.

LIST OF DESIGNATION

1 Brake system
2 Compressor
4 Compressed air supply line
6 Compressed air supply line
8 Compressed air store
10 Compressed air store
12 Overflow valve
14 Overflow valve
16 Check valve
18 Check valve
20 Compressed air supply line
22 Trailer control valve
24 Overflow valve
26 Check valve
28 Store connector
30 Brake control device
32 First output connector
33 Spring brake cylinder
34 Second output connector
36 Valve device
38 Connector
40 Control input
42 Relay valve 44 Operating output
46 Control device
48 Parking brake signal terminal
50 Parking brake signal transmitter
52 Control air line
53 Third output connector
54 Store input
56 Compressed air connection
58 2/2-way valve
60 Inlet
62 First pressure connection
64 Outlet
66 Control connector
68 Ventilation means
70 Check valve
72 Shuttle valve
74 Second pressure connection
76 Outlet
78 First inlet
80 Second inlet
82 Throttle device
84 Throttle device
86 Battery
88 Pressure line The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electropneumatic brake control device for controlling a parking brake of a vehicle having a service brake and the parking brake, comprising:
    a) an electromagnetic valve device which is controlled by an electronic control device and is supplied with compressed air from a compressed air store via a store connector;
    b) a parking brake signal terminal for inputting parking brake signals which are output by way of an electric parking brake signal transmitter;
    c) a valve device which is controlled pneumatically by the electromagnetic valve device and boosts the air quantity, with an operating output which can be connected to a first output connector for at least one spring brake cylinder, which operating output is ventilated in order to apply the at least one spring brake cylinder and is aerated in order to release it;
    d) a control air line between an outlet of the electromagnetic valve device and a pneumatic control input of the valve device which boosts the air quantity;
    e) a pneumatically controlled 2/2-way valve, with an inlet which is connectable or is connected to the control air line or to the operating output of the valve device which boosts the air quantity, an outlet which is connected to a pressure sink, and with a pneumatic control connector for a supply pressure of the service brake, wherein
    f) the pneumatically controlled 2/2-way valve has two positions, a passage position which is set at a supply pressure of the service brake which is lower than a predefined pressure limit value and in which the inlet is connected to the outlet, and a shut-off position which is set at a supply pressure of the service brake which is greater than a predefined pressure limit value and in which the inlet is shut off with respect to the outlet.

2. The electropneumatic brake control device as claimed in claim 1, wherein the 2/2-way valve is formed by way of a diaphragm valve.

3. The electropneumatic brake control device as claimed in claim 1, wherein the brake control device is one structural unit.

4. The electropneumatic brake control device as claimed in claim 1, wherein the 2/2-way valve is spring-loaded into the passage position counter to the action of a supply pressure of the service brake which prevails at the pneumatic control connector.

5. The electropneumatic brake control device as claimed in claim 1, wherein the brake control device has at least one second output connector for a trailer control valve, the valve device being connected to the control air line and being configured such that it outputs a pressure signal which represents the parked state to the second output connector in the case of a pressure drop in the control air line which is brought about by way of the passage position of the pneumatically controlled 2/2-way valve.

6. The electropneumatic brake control device as claimed in claim 1, wherein the pressure sink is formed by way of a ventilating connector which opens to atmosphere or by way of at least one compressed air store.

7. The electropneumatic brake control device as claimed in claim 6, wherein a check valve is arranged in the first pressure connection between the inlet of the 2/2-way valve and the control air line, by way of which check valve a compressed air flow from the control air line to the outlet is made possible, but a compressed air flow from the outlet (64) into the control air line is suppressed.

8. An electropneumatic brake system of a vehicle, comprising:
    a service brake;
    a parking brake, wherein
    the service brake has a brake pedal and at least one compressed air store which is supplied with compressed air by a compressor and from which compressed air can be input in a manner which is dependent on an actuation of the brake pedal into service brake cylinders which can be actuated by compressed air,
    the parking brake has an electric parking brake signal transmitter which inputs parking brake signals into a parking brake signal terminal of an electropneumatic brake control device, wherein the electropneumatic brake control device comprises
    an electromagnetic valve device which is controlled by an electronic control device and is supplied with compressed air,
    the parking brake signal terminal;
    a valve device which is controlled pneumatically by the electromagnetic valve device and boosts the air quantity, with an operating output which can be connected to a first output connector for at least one spring brake cylinder of the parking brake, which operating output is ventilated in order to apply the at least one spring brake cylinder and is aerated in order to release it;
    a control air line between an outlet of the electromagnetic valve device and a pneumatic control input of the valve device which boosts the air quantity;
    a pneumatically controlled 2/2-way valve, with an inlet which is connectable or is connected to the control air line or to the operating output of the valve device which boosts the air quantity, an outlet which is connected to a pressure sink, and with a pneumatic control connector for a supply pressure of the service brake, wherein the pneumatically controlled 2/2-way valve has two positions, a passage position which is set at a supply pressure of the service brake which is lower than a predefined pressure limit value and in which the inlet is connected to the outlet, and a shut-off position which is set at a supply pressure of the service brake which is greater than a predefined pressure limit value and in which the inlet is shut off with respect to the outlet.

9. The electropneumatic brake system as claimed in claim 8, wherein at least two service brake circuits with in each case one dedicated compressed air store are provided, namely a first service brake circuit with a first compressed air store and a second service brake circuit with a second compressed air store, a selection device being provided for forwarding the higher supply pressure of the supply pressures of the compressed air stores to the pneumatic control connector of the 2/2-way valve, with a first inlet which is connected to the first compressed air store of the first service brake circuit, a second inlet which is connected to the second compressed air store of the second service brake circuit, and an outlet which is connected to the pneumatic control connector of the 2/2-way valve.

10. The electropneumatic brake system as claimed in claim 9, wherein the selection device is formed by way of a shuttle valve.

11. The electropneumatic brake system as claimed in claim 9, wherein in each case one throttle device is provided between the first compressed air store and the first inlet of the selection device and between the second compressed air store and the second inlet of the selection device, and a throttle cross section of said throttle device is at least so small that a volumetric flow which has occurred unintentionally between the first inlet and the second inlet of the selection device is smaller than a minimum delivery volumetric flow which the compressor is capable of additionally delivering into the compressed air stores at a minimum delivery output.

12. A vehicle, comprising an electropneumatic brake system as claimed in claim 8.

* * * * *